United States Patent [19]

Masuhra et al.

[11] Patent Number: 5,183,695
[45] Date of Patent: Feb. 2, 1993

[54] INTERIOR FINISH SURFACE MATERIAL FOR AUTOMOBILES

[75] Inventors: Shohei Masuhra, Takatsuki; Satoshi Tonoki, Suita; Toshiya Shibukawa, Atsugi; Hirsohi Sugawara, Zushi, all of Japan

[73] Assignees: Kanegafuchi Kagaku Kogyo Kabushiki Kaisha, Osaka; Nissan Motor Co., Ld., Yokohama, both of Japan

[21] Appl. No.: 894,473

[22] Filed: Jun. 5, 1992

[30] Foreign Application Priority Data

Jun. 7, 1991 [JP] Japan .................................. 3-136493

[51] Int. Cl.$^5$ .................................................. B32B 3/26
[52] U.S. Cl. .................................... 428/151; 428/284; 428/290; 428/304.4; 428/319.7; 428/904
[58] Field of Search ............... 428/151, 218, 284, 290, 428/304.4, 319.7, 904

[56] References Cited

U.S. PATENT DOCUMENTS

| | | | |
|---|---|---|---|
| 3,764,642 | 10/1973 | Boutillier | 428/218 |
| 4,504,536 | 3/1985 | Wong | 428/151 |
| 4,614,671 | 9/1986 | Wong | 428/904 |

Primary Examiner—William J. Van Balen
Attorney, Agent, or Firm—Varndell Legal Group

[57] ABSTRACT

An interior finish surface material for automobiles having good heat moldability such as high stretchability, low shrinkability after molding, good feeling of touch and good retainability of embossed pattern and comprising a surface layer and at least one of a base layer and a foam layer provided between said surface layer and said base layer, said surface layer being made from a composition comprising (A) 100 parts by weight of a vinyl chloride resin, (B) 20 to 200 parts by weight of at least one of a plasticizer and a thermoplastic elastomer, (C) 2 to 150 parts by weight of an AMBS resin and (D) 0 to 100 parts by weight of an inorganic filler.

25 Claims, No Drawings

INTERIOR FINISH SURFACE MATERIAL FOR AUTOMOBILES

BACKGROUND OF THE INVENTION

The present invention relates to an interior finish surface material for automobiles, and more particularly to a surface material for interior equipments of automobiles comprising built-up layers having a stretchability sufficient for heat molding, a low shrinkability and a good retainability of embossed patterns.

In recent years, artificial leathers or synthetic resin coated fabrics have been widely used for interior finish of automobiles as a leather substitute. These synthetic surface materials have an appearance and a feeling of touch which are similar to natural leathers. Various kinds of the synthetic surface materials such as vinyl chloride type, urethane type and other resin types are known, and the vinyl chloride resin surface materials are the most popular.

As the structures of these synthetic surface materials, there are known, for example, a two layer structure consisting of a surface layer (skin layer) and a base layer as a backing material for the surface layer, a three layer structure consisting of a surface layer, a foam layer and a base layer as a backing, and a two layer structure consisting of a surface layer and a foam layer. The three layer structure consisting of the surface, foam and base layers is the most popular among them.

The surface layer is used for the purpose of providing appearance and feeling of touch resembling natural leathers, and the foam layer is used for providing feeling of touch like natural leathers. The base layer is for keeping a shape and/or for improving the feeling of touch, and plastic sheets such as vinyl chloride resin sheets and fabrics of various kinds of synthetic and natural fibers have been generally used as the base layer.

In case of using these surface materials as the automobile interior finish surface materials, they are stuck to interior materials or equipments of automobiles such as trim, instrument panel and seat. The surface materials may be previously formed into the same shape as the interior equipments or parts of automobiles in order to raise the productivity in assembling, and a heat molding such as vacuum molding is a popular molding method for this purpose.

In case of conducting the heat molding such as vacuum molding, it is necessary that surface materials sufficiently stretch at a molding temperature without breaking, and the shrinkability of molded surface materials after releasing from a mold is small. It is also important that embossed patterns do not disappear by heat and stretching in the heat molding, namely the retainability of embossed pattern is good.

With respect to the required stretchability at a molding temperature, it varies depending on the shapes of automobile interior equipments, but in some cases, a stretchability of 100% or more is required. With respect to the shrinkability after molding, a shrinkability of about 20/1000 or less is generally desirable from the viewpoint of matching or engagement with automobile interior equipments. A usual manner for decreasing the shrinkability is incorporation of inorganic fillers such as talc, but the incorporation of inorganic fillers has the defect that the stretchability of the obtained surface materials is decreased.

Plasticized polyvinyl chloride sheets composed of vinyl chloride resins, plasticizers and stabilizers are generally used as the surface layer and as the plastic sheet base layer. In case of usual plasticized polyvinyl chloride sheets, the stretchability at a molding temperature does not reach 100%, and in particular, those containing inorganic fillers show a smaller stretchability.

It is an object of the present invention to eliminate defects of known interior finish surface materials for automobiles.

A further object of the present invention is to provide an automobile interior finish surface material having a sufficient stretchability required in heat molding, a low shrinkability after molding and a good retainability of embossed pattern.

These and other objects of the present invention will become apparent from the description hereinafter.

SUMMARY OF THE INVENTION

It has been found that characteristics, particularly stretchability, of automobile interior finish surface materials can be remarkably improved, when a specific amount of AMBS series resins, e.g. copolymers of a butadiene rubber, an aromatic vinyl compound such as styrene or α-methylstyrene, acrylonitrile and optionally an alkyl (meth)acrylate, are incorporated in vinyl chloride resin compositions for preparing the automobile interior finish surface materials, and the surface layer or both the surface layer and the base layer of the interior finish surface materials are prepared from the compositions.

In accordance with the present invention, there is provided an interior finish surface material for automobiles comprising a surface layer and at least one of a base layer and a foam layer provided between said surface layer and said base layer, said surface layer being made from a composition comprising (A) 100 parts by weight of a vinyl chloride resin, (B) 20 to 200 parts by weight of at least one of a plasticizer and a thermoplastic elastomer, (C) 2 to 150 parts by weight of an AMBS resin and (D) 0 to 100 parts by weight of an inorganic filler.

The base layer may also be prepared from the above-mentioned vinyl chloride resin composition or may be those conventionally used, e.g. fabrics and other sheet materials.

DETAILED DESCRIPTION

In the present invention, the surface layer of the interior finish surface material is prepared from a vinyl chloride resin composition containing (A) a vinyl chloride resin, (B) a plasticizer and/or a thermoplastic elastomer, (C) an AMBS resin, and optionally an inorganic filler. The composition may further contain usual additives.

The vinyl chloride resin (A) used in the present invention includes, for instance, a vinyl chloride homopolymer and a copolymer of vinyl chloride and a small amount of other copolymerizable monomers, especially at most 10% by weight of other copolymerizable monomers such as vinyl acetate and acrylonitrile. The use of partly crosslinked vinyl chloride resins is preferred from the viewpoint of the retainability of embossed patterns of the surface layer.

It is desirable, from the viewpoint of kneading property and physical properties such as strength, that the vinyl chloride resin (A) has a degree of polymerization of 1,000 to 4,000. It is also desirable that the gel fraction of the crosslinked vinyl chloride resins is from about 2 to about 20%.

In order to impart a flexibility like leathers to the surface material and also to improve the processability of vinyl chloride resins, at least one of a plasticizer and a thermoplastic elastomer are used as the component (B) in the present invention.

Examples of the plasticizer are, for instance, a phthalate plasticizer such as dibutyl phthalate, dioctyl phthalate, diundecyl phthalate or diisodecyl phthalate, an adipate plasticizer such as dibutyl adipate or dioctyl adipate, a trialkyl trimellitate such as trioctyl trimellitate, and other known plasticizers. Low volatile plasticizers such as diundecyl phthalate, diisodecyl phthalate and trioctyl trimellitate are preferred.

Single use of the plasticizer may give a sticky feeling at a high temperature or may decrease the retainability of embossed pattern. Thermoplastic elastomers can be used alone or in combination with plasticizers as the component (B) for the purpose of eliminating these possible defects in addition to the above-mentioned purposes of improving the flexibility and the processability. Any thermoplastic elastomers can be used in the present invention so long as they can achieve these effects. Examples of such thermoplastic elastomers are, for instance, a polyesterether elastomer, a polyesterurethane elastomer, a polyetherurethane elastomer, and a polyolefin elastomer. Thermoplastic elastomers having a good compatibility with vinyl chloride resins, e.g. the polyester type or polyurethane type elastomers, are preferred.

In case of using the plasticizer in combination with the thermoplastic elastomer, there are preferred combinations of low volatile plasticizers such as diundecyl phthalate, diisodecyl phthalate or trioctyl trimellitate and thermoplastic elastomers such as polyester type elastomers or polyurethane type elastomers. It is preferable that the ratio of the plasticizer to the elastomer is from 3/1 to 1/1 by weight.

The amount of the plasticizer is from 20 to 200 parts by weight, preferably 50 to 150 parts by weight, per 100 parts by weight of the vinyl chloride resin (A). The amount of the thermoplastic elastomer is from 20 to 200 parts by weight, preferably 20 to 100 parts by weight, per 100 parts by weight of the vinyl chloride resin (A). In case of using the plasticizer and the elastomer in combination, they are used so that the total amount falls within the range of 20 to 200 parts by weight, preferably 80 to 180 parts by weight, per 100 parts by weight of the vinyl chloride resin (A). In that case, preferably the plasticizer is selected from the range of 10 to 150 parts by weight, especially 50 to 150 parts by weight, and the elastomer is selected from the range of 10 to 150 parts by weight, especially 30 to 100 parts by weight, respectively, per 100 parts by weight of the vinyl chloride resin (A). When the amount of the component (B) is less than the above range, not only a flexibility or softness like natural leathers is not exhibited, but also the obtained surface material is lacking in stretchability required in heat molding. When the amount is more than the above range, characteristics of the vinyl chloride resins are not sufficiently exhibited. In particular, from the viewpoints of embossed pattern retainability and elimination of sticky feeling, it is desirable that the amount of the plasticizer is as small as possible within the range capable of imparting a satisfactory flexibility or softness and, therefore, a combination use of the plasticizer and the elastomer is preferred.

The AMBS resins used as the component (C) in the present invention include copolymers of (1) a rubber-like elastomer, (2) an aromatic vinyl monomer, and at least one of (3) a vinyl cyanide monomer and (4) an acrylic or methacrylic acid ester, and blends of copolymers containing at least two of these components (1) to (4). It is desirable to use such an AMBS resin that a methyl ethyl ketone soluble component of the AMBS resin has an intrinsic viscosity of 0.2 to 1.5 dl/g (N,N-dimethylformamide solution, at 30° C.), since a rubber-like elasticity can be effectively exhibited. The content of the methyl ethyl ketone soluble component in the AMBS resin is preferably from 60 to 97% by weight.

As the rubber-like elastomers (1), those having a glass transition temperature of not more than 0° C., especially not less than $-40°$ C., are preferred. Examples of the rubber-like elastomers are, for instance, a diene rubber such as polybutadiene, butadiene-styrene copolymer, butadiene-acrylonitrile copolymer or butadiene-butyl acrylate copolymer, a polybutyl acrylate, an ethylene-propylene rubber such as ethylene-propylene copolymer (EPM) or ethylene-propylene-diene copolymer (EPDM), and the like.

Examples of the aromatic vinyl monomer (2) are, for instance, styrene and α-methylstyrene.

Examples of the vinyl cyanide monomer (3) are, for instance, acrylonitrile and methacrylonitrile.

Examples of the (meth)acrylic acid ester (4) are lower alkyl (meth)acrylates having a $C_1$ to $C_4$ alkyl group such as methyl methacrylate and methyl acrylate.

Preferable AMBS resins are copolymers of 2 to 25 % by weight of the rubber-like elastomer (1), 5 to 70% by weight of the aromatic vinyl monomer (2), 10 to 30% by weight of the vinyl cyanide monomer (3) and optionally at most 20% by weight of the lower alkyl (meth)acrylate (4). Copolymers of 2 to 25% by weight of a butadiene homopolymer or copolymer, 30 to 70% by weight of α-methylstyrene, 5 to 25% by weight of styrene, 10 to 30% by weight of acrylonitrile and 0 to 20% by weight of methyl methacrylate are more preferred, since the stretchability of the obtained interior finish surface material at the time of molding can be remarkably improved.

The method for the preparation of the AMBS resins is not particularly limited, and they can be prepared by any methods such as solution polymerization, suspension polymerization, bulk polymerization and emulsion polymerization in known manners. For example, a diene rubber is first prepared, and monomers are then polymerized in the presence of the diene rubber.

The AMBS resins are used in an amount of 2 to 150 parts by weight, preferably 5 to 100 parts by weight, per 100 parts by weight of the vinyl chloride resin. When the amount is less than 2 parts by weight, improvement in the stretchability is insufficient. When the amount is more than 150 parts by weight, the characteristics of the vinyl chloride resin are lost, and the flexibility or softness is also insufficient.

An inorganic filler may be added to the vinyl chloride resin composition in order to decrease the shrinkage of moldings after heat molding or in order to raise the retainability of embossed pattern. Known inorganic fillers can be used, e.g. talc, mica and calcium carbonate. Talc is particularly preferred from the viewpoints of shrinkability, embossed pattern retainability and cost.

The amount of the inorganic filler is from 0 to 100 parts by weight per 100 parts by weight of the vinyl chloride resin. In view of a balance with the stretchability and the softness, the organic filler is used preferably in an amount of at most 50 parts by weight, especially 20 to 50 parts by weight, per 100 parts by weight of the vinyl chloride resin.

The vinyl chloride resin composition used for preparing the interior finish surface material may contain other additives conventionally used for vinyl chloride resins, e.g. antioxidant, heat stabilizer, light stabilizer, ultraviolet absorber, lubricant, pigment, dye, water absorptive resin and improver of processability.

The preparation of the vinyl chloride resin composition can be made by any methods, for example, by mixing using a blender or a super mixer, or by kneading using a pressure kneader, a mixing roll or an extruder.

The surface layer for providing the automobile interior finish surface material with good appearance and feeling of touch is formed from the vinyl chloride resin composition mentioned above.

The automobile interior finish surface material of the present invention is prepared by forming the surface layer on a foam layer which serves to raise the feeling of touch, or by forming the surface layer on a base layer which serves to retain the shape of moldings and/or to raise the feeling of touch, or by forming the foam layer and the surface layer on the base layer in that order.

The conditions of the surface layer, e.g. thickness, state of surface and flexibility, are not particularly restricted, but usually, the thickness is from about 0.1 to about 0.5 mm and the JIS hardness is not more than about 90. Also, an embossed pattern like leather is usually provided to the surface layer.

The surface layer can be formed by known usual methods, e.g. calendering and extrusion.

The materials and characteristics of the foam layer used in the present invention are not particularly limited, and usual foam layers conventionally used for automobile interior finish surface materials can be used. Foam layers which are easy to adhere or thermally fuse to the surface layer are preferable. From the viewpoint of the feeling of touch of the obtained surface material, preferably the expansion ratio is from about 1.5 to about 6, and the thickness is from about 0.5 to about 1.5 mm.

Preferable examples of the foam layer used in the present invention are, for instance, a polyvinyl chloride foam, a polyethylene foam and a polyurethane foam.

The materials and characteristics of the base layer on which the surface layer is formed directly or through the foam layer, are also not limited particularly, and conventionally used base layers can be used in the present invention, e.g. fabrics of natural or synthetic fibers and plastic sheets. Since the base layer is adhered to or thermally fused to the surface layer or the foam layer, those easy to adhere or thermally fuse to them are preferable. Also, base layers having a good stretchability at molding temperatures and a low shrinkability are preferable from the viewpoints of increasing the stretchability and decreasing the shrinkability of the obtained interior finish surface material. Further, base layers which show a higher regidity than the surface layer after molding are preferred in order to provide molded surface materials with shape retainability. The vinyl chloride resin composition used for the preparation of the surface layer and fabrics of heat moldable fibers can provide such a base layer.

In case of preparing the base layer from the vinyl chloride resin composition, sheets having a thickness of about 0.3 to about 1 mm and a JIS hardness of at least 90 are usually employed. The use of the base layer prepared from the vinyl chloride resin composition is advantageous in that deformation of the surface material owing to stretching and shrinking at the time of molding is hard to occur since the thermal behaviors of the surface layer and the base layer are the same.

In case of using fabrics as the base layer, various fabrics such as plain weave fabrics, twill fabrics, knitted goods and non woven fabrics can be used. Fabrics having a weight of 50 to 300 $g/m^2$ are usually employed. Heat moldable fabrics, e.g. fabric of modacrylic fiber and fabric of polyvinyl chloride, are preferred. The surface materials prepared using a fabric as the base layer generally have a good feeling of touch.

The preparation of automobile interior finish surface materials of the invention can be made in various manners, for example, by separately preparing each of the surface, foam and base layers and fusing together the surface layer and the foam or base layer or all of these layers, or by adhering the layers with an adhesive, or by adhering the layers by a combination use of fusion and adhesion with an adhesive.

The automobile interior finish surface materials of the present invention having a three layered structure of the base, foam and surface layers built-up in that order have a good feeling of touch and a good shape retainability of moldings. In accordance with one of preferable examples, the automobile interior finish surface material is composed of a surface layer formed from the above-mentioned vinyl chloride resin composition having a thickness of about 0.1 to about 0.5 mm and a JIS hardness of about 80 to about 90 and having an embossed pattern similar to natural leathers or skins, a foam layer of polyvinyl chloride having a thickness of about 0.5 to about 1 mm and an expansion ratio of about 1.5 to about 6, and a base layer formed from the above-mentioned vinyl chloride resin composition having a thickness of about 0.3 to about 1 mm or a fabric of a modacrylic fiber having a weight of about 50 to about 200 $g/m^2$ as the base layer.

The automobile interior finish surface materials of the present invention having a two layered structure of the surface and base layers have the features that the whole thickness is thin and moreover the shape retainability of moldings is good. In accordance with a preferable example, the surface material is composed of a surface layer formed from the above-mentioned vinyl chloride resin composition having a thickness of about 0.1 to about 0.5 mm and a JIS hardness of about 70 to about 80 and having an embossed pattern similar to natural leathers or skins, and a base layer formed from the above-mentioned vinyl chloride resin composition having a thickness of about 0.3 to about 1 mm or a fabric of a modacrylic fiber having a weight of about 100 to about 300 $g/m^2$ as the base layer.

The automobile interior finish surface materials of the present invention having a two layered structure of the surface and foam layers have the features that the feeling of touch is good and the whole weight is light. In accordance with a preferable example, the surface material is composed of a surface layer formed from the above-mentioned vinyl chloride resin composition having a thickness of about 0.3 to about 0.5 mm and a JIS hardness of about 80 to about 90 and having an embossed pattern similar to natural leathers or skins, and a foam layer of polyvinyl chloride having a thickness of about 0.5 to about 1.5 mm and an expansion ratio of 1.5 to 10, preferably about 3 to about 6.

The present invention is more specifically described and explained by means of the following Examples, in which all % and parts are by weight unless otherwise noted.

EXAMPLES 1 TO 7 AND COMPARATIVE EXAMPLES 1 TO 5

(1) Preparation of surface layer

The following ingredients were mixed according to the recipes shown in Table 1, kneaded by a mixing roll at 165° C. for 15 minutes, and formed into a sheet having a thickness of 0.35 mm by a calendering roll to give a surface layer.

Ingredients

Polyvinyl chloride: degree of polymerization 2,000
Partly crosslinked polyvinyl chloride: gel fraction 7%, degree of polymerization 4,000
AMBS resin: copolymer of 18% of polybutadiene, 40% of α-methylstyrene, 15% of styrene, 15% of acrylonitrile and 12% of methyl methacrylate
Plasticizer: trioctyl trimellitate (TOTM)
Thermoplastic elastomer: urethane elastomer (commercially available under the trade mark "Elastollan" ET-590 made by Takeda Badische Urethane Kabushiki Kaisha)
Inorganic filler: talc (commercially available under the trademark "Microace K-1" made by Nippon Talc Kabushiki Kaisha)
Stabilizer: Ba-Zn, Ca-Zn, epoxy composite stabilizer.

(2) Preparation of foam layer

The following ingredients were mixed, kneaded by a mixing roll at 145° C. for 15 minutes, and formed into a sheet having a thickness of 0.3 mm by a calendering roll, and the sheet was heated to give a foam having a thickness of 1.0 mm an an expansion ratio of 3.5.

| Ingredients | Amount |
|---|---|
| Polyvinyl chloride having a degree of polymerization of 2,000 | 100 parts |
| Plasticizer, DUP (undecyl phthalate) | 100 parts |
| Foaming agent (trademark "Onifine-CC", product of Otsuka Kagaku K.K.) | 30 parts |

(3) Preparation of base layer 1

The following ingredients were mixed according to the recipes shown in Table 1, kneaded by a mixing roll at 165° C. for 15 minutes, and formed into a sheet having a thickness of about 0.35 mm to give base layer 1 (hereinafter referred to as "base 1").

(4) Base layer 2

A commercially available plain weave fabric of a modacrylic fiber having a weight of 100 g/m² was used as base layer 2 (hereinafter referred to as "base 2").

(5) Preparation of interior finish surface material

Each of the layers obtained in (1) to (4) was preheated to 160° C., and the layers were passed through embossing rolls having a pattern like a leather under a pressure of 5 kg/cm²G to adhere each other by fusion, thus providing a surface material of three layered structure with an embossed pattern on its surface layer.

(6) Estimation of surface material by vacuum molding

The obtained surface materials were molded at a temperature of 150° to 160° C. by a vacuum molding machine using a mold requiring stretching of not less than 100%. Occurrence of breaking of the surface material at the time of molding, shrinkability of moldings, feeling of touch and embossed pattern retainability of moldings were observed and estimated according to the following methods.

The results are shown in Table 1.

Shrinkability

Vacuum molding was conducted by using a mold provided with a trapezoid-shaped projection so as to give marked lines on the obtained molding at a distance of 100 mm, and the distance between the marked lines was measured 24 hours after taking out of the mold.

Feeling of touch

The feeling was estimated according to the following criteria by feeling the surface layer of the molded surface material with fingers.

A: Softness and feeling of sliminess are similar to those of natural leather and are very good.
B: Softness and feeling of sliminess are good.
C: Softness and feeling of sliminess are different from those of natural leather and are bad.

Embossed pattern retainability

The embossed pattern of the surface layer of the molded surface material was visually observed 1 hour after the molding and estimated according to the following criteria.

A: Embossed pattern scarcely disappears and retainability is very good.
B: Retainability is good.
C: Embossed pattern is indistinct.

As apparent from the results shown in Table 1, the interior finish surface materials for automobiles of the present invention have a good moldability, a low shrinkability after molding, a good feeling of touch and a good retainability of embossed pattern.

In addition to the ingredients used in the Examples, other ingredients can be used in the Examples as set forth in the specification to obtain substantially the same results.

TABLE 1

| | Ex. 1 | Ex. 2 | Ex. 3 | Ex. 4 | Ex. 5 | Ex. 6 | Ex. 7 |
|---|---|---|---|---|---|---|---|
| Composition of surface layer (part) | | | | | | | |
| Polyvinyl chloride | 100 | 0 | 0 | 0 | 0 | 0 | 0 |
| Partly crosslinked PVC | 0 | 100 | 100 | 100 | 100 | 100 | 100 |
| AMBS resin | 30 | 30 | 5 | 100 | 30 | 30 | 150 |
| Plasticizer | 75 | 75 | 60 | 115 | 75 | 75 | 140 |
| Thermoplastic elastomer | 45 | 45 | 45 | 45 | 45 | 45 | 45 |
| Inorganic filler | 30 | 30 | 30 | 30 | 0 | 30 | 30 |
| Stabilizer | 8 | 8 | 8 | 8 | 8 | 8 | 8 |
| Kind of base layer | Base 1 | Base 1 | Base 1 | Base 1 | Base 1 | Base 2 | Base 1 |
| Composition of base 1 | | | | | | | |
| Polyvinyl chloride | 100 | 100 | 100 | 100 | 100 | — | 100 |
| AMBS resin | 30 | 30 | 5 | 100 | 30 | — | 150 |

TABLE 1-continued

| | | | | | | | |
|---|---|---|---|---|---|---|---|
| Plasticizer | 75 | 75 | 60 | 115 | 75 | — | 140 |
| Inorganic filler | 30 | 30 | 30 | 30 | 0 | — | 30 |
| Stabilizer | 8 | 8 | 8 | 8 | 8 | — | 8 |
| Breaking in molding | no | no | no | no | no | no | no |
| Shrinkability | 15/1000 | 15/1000 | 15/1000 | 15/1000 | 45/1000 | 15/1000 | 15/1000 |
| Feeling of touch | A | A | A | A-B | A | A | B |
| Pattern retainability | B | A | A | B | B | A | B |

| | Com. Ex. 1 | Com. Ex. 2 | Com. Ex. 3 | Com. Ex. 4 | Com. Ex. 5 |
|---|---|---|---|---|---|
| Composition of surface layer (part) | | | | | |
| Polyvinyl chloride | 100 | 0 | 100 | 0 | 0 |
| Partly crosslinked PVC | 0 | 100 | 0 | 100 | 100 |
| AMBS resin | 0 | 0 | 0 | 0 | 200 |
| Plasticizer | 75 | 75 | 75 | 75 | 170 |
| Thermoplastic elastomer | 45 | 45 | 45 | 45 | 45 |
| Inorganic filler | 30 | 30 | 0 | 0 | 30 |
| Stabilizer | 8 | 8 | 8 | 8 | 8 |
| Kind of base layer | Base 1 | Base 1 | Base 1 | Base 1 | Base 1 |
| Composition of base 1 | | | | | |
| Polyvinyl chloride | 100 | 100 | 100 | 100 | 100 |
| AMBS resin | 0 | 0 | 0 | 0 | 200 |
| Plasticizer | 75 | 75 | 75 | 75 | 170 |
| Inorganic filler | 30 | 30 | 0 | 0 | 30 |
| Stabilizer | 8 | 8 | 8 | 8 | 8 |
| Breaking in molding | yes | yes | yes | yes | no |
| Shrinkability | 15/1000 | 15/1000 | 45/1000 | 45/1000 | 15/1000 |
| Feeling of touch | A | A | A | A | C |
| Pattern retainability | B | A | C | B | B |

What we claim is:

1. An interior finish surface material for automobiles comprising a surface layer and at least one of a base layer and a foam layer provided between said surface layer and said base layer, said surface layer being made from a composition comprising (A) 100 parts by weight of a vinyl chloride resin, (B) 20 to 200 parts by weight of at least one of a plasticizer and a thermoplastic elastomer, (C) 2 to 150 parts by weight of an AMBS resin and (D) 0 to 100 parts by weight of an inorganic filler.

2. The interior finish surface material of claim 1, wherein said AMBS resin is a copolymer of a rubber-like elastomer, an aromatic vinyl monomer and at least one of a vinyl cyanide monomer and an alkyl acrylate or methacrylate.

3. The interior finish surface material of claim 1, wherein said AMBS resin is a copolymer of a rubber-like elastomer, an aromatic vinyl monomer, a vinyl cyanide monomer and a lower alkyl acrylate or methacrylate.

4. The interior finish surface material of claim 1, wherein said AMBS resin is a copolymer of a rubber-like elastomer, an aromatic vinyl monomer and a vinyl cyanide monomer.

5. The interior finish surface material of claim 1, wherein said AMBS resin is a copolymer of 2 to 25% by weight of a butadiene polymer, 30 to 70% by weight of α-methylstyrene, 5 to 25% by weight of styrene, 10 to 30% by weight of acrylonitrile and 0 to 20% by weight of methyl methacrylate.

6. An interior finish surface material for automobiles comprising a base layer, a foam layer formed on said base layer and a surface layer formed on said foam layer, said surface layer comprising (A) 100 parts by weight of a vinyl chloride resin, (B) 20 to 200 parts by weight of at least one of a plasticizer and a thermoplastic elastomer, (C) 2 to 150 parts by weight of an AMBS resin and (D) 0 to 100 parts by weight of an inorganic filler.

7. The interior finish surface material of claim 6, wherein said base layer comprises (A) 100 parts by weight of a vinyl chloride resin, (B) 20 to 200 parts by weight of at least one of a plasticizer and a thermoplastic elastomer, (C) 2 to 150 parts by weight of an AMBS resin and (D) 0 to 100 parts by weight of an inorganic filler.

8. The interior finish surface material of claim 6, wherein said base layer is a heat moldable fabric.

9. The interior finish surface material of claim 6, wherein said vinyl chloride resin is a partly crosslinked polyvinyl chloride.

10. The interior finish surface material of claim 6, wherein said AMBS resin is a copolymer of 2 to 25% by weight of a butadiene polymer, 30 to 70% by weight of α-methylstyrene, 5 to 25% by weight of styrene, 10 to 30% by weight of acrylonitrile and 0 to 20% by weight of methyl methacrylate.

11. The interior finish surface material of claim 6, wherein said inorganic filler is talc.

12. The interior finish surface material of claim 7, wherein said vinyl chloride resin is a partly crosslinked polyvinyl chloride.

13. The interior finish surface material of claim 7, wherein said inorganic filler is talc.

14. An interior finish surface material for automobiles comprising a base layer and a surface layer formed on said base layer, said surface layer comprising (A) 100 parts by weight of a vinyl chloride resin, (B) 20 to 200 parts by weight of at least one of a plasticizer and a thermoplastic elastomer, (C) 2 to 150 parts by weight of an AMBS resin and (D) 0 to 100 parts by weight of an inorganic filler.

15. The interior finish surface material of claim 14, wherein said base layer comprises (A) 100 parts by weight of a vinyl chloride resin, (B) 20 to 200 parts by weight of at least one of a plasticizer and a thermoplastic elastomer, (C) 2 to 150 parts by weight of an AMBS resin and (D) 0 to 100 parts by weight of an inorganic filler.

16. The interior finish surface material of claim 14, wherein said base layer is a heat moldable fabric.

17. The interior finish surface material of claim 14, wherein said vinyl chloride resin is a partly crosslinked polyvinyl chloride.

18. The interior finish surface material of claim 14, wherein said AMBS resin is a copolymer of 2 to 25% by weight of a butadiene polymer, 30 to 70% by weight of α-methylstyrene, 5 to 25% by weight of styrene, 10 to 30% by weight of acrylonitrile and 0 to 20% by weight of methyl methacrylate.

19. The interior finish surface material of claim 14, wherein said inorganic filler is talc.

20. The interior finish surface material of claim 15, wherein said AMBS resin is a copolymer of 2 to 25% by weight of a butadiene polymer, 30 to 70% by weight of α-methylstyrene, 5 to 25% by weight of styrene, 10 to 30% by weight of acrylonitrile and 0 to 20% by weight of methyl methacrylate.

21. The interior finish surface material of claim 15, wherein said inorganic filler is talc.

22. An interior finish surface material for automobiles comprising a foam layer and a surface layer formed on said foam layer, said surface layer comprising (A) 100 parts by weight of a vinyl chloride resin, (B) 20 to 200 parts by weight of at least one of a plasticizer and a thermoplastic elastomer, (C) 2 to 150 parts by weight of an AMBS resin and (D) 0 to 100 parts by weight of an inorganic filler.

23. The interior finish surface material of claim 22, wherein said vinyl chloride resin is a partly crosslinked polyvinyl chloride.

24. The interior finish surface material of claim 22, wherein said AMBS resin is a copolymer of 2 to 25% by weight of a butadiene polymer, 30 to 70% by weight of α-methylstyrene, 5 to 25% by weight of styrene, 10 to 30% by weight of acrylonitrile and 0 to 20% by weight of methyl methacrylate.

25. The interior finish surface material of claim 22, wherein said inorganic filler is talc.

* * * * *

UNITED STATES PATENT AND TRADEMARK OFFICE
CERTIFICATE OF CORRECTION

PATENT NO. : 5,183,695
DATED : February 2, 1993
INVENTOR(S) : Shohei Masuhara, et. al.

It is certified that error appears in the above-indentified patent and that said Letters Patent is hereby corrected as shown below:

On the Title page, item [75], change inventor's name from "Masuhra et al." to --Masuhara et al.--
Change "Hirsohi" to --Hiroshi--.

Signed and Sealed this

Eleventh Day of January, 1994

*Attest:*

BRUCE LEHMAN

*Attesting Officer*     *Commissioner of Patents and Trademarks*